(12) United States Patent
Rogalka et al.

(10) Patent No.: US 8,857,791 B2
(45) Date of Patent: Oct. 14, 2014

(54) BALANCING VALVE

(75) Inventors: Marcin Rogalka, Bystrzyca Klodzka (PL); Andrzej Lisowski, Klodzko (PL); Boguslaw Deren, Gorzanow (PL); Edmund Golabek, Klodzko (PL)

(73) Assignee: Zetkama Spólka Akcyjna, Scinawka Srednia (PL)

( * ) Notice: Subject to any disclaimer, the term of this patent is extended or adjusted under 35 U.S.C. 154(b) by 0 days.

(21) Appl. No.: 13/879,925

(22) PCT Filed: Oct. 27, 2011

(86) PCT No.: PCT/PL2011/000112
§ 371 (c)(1),
(2), (4) Date: May 8, 2013

(87) PCT Pub. No.: WO2012/057641
PCT Pub. Date: May 3, 2012

(65) Prior Publication Data
US 2013/0240769 A1    Sep. 19, 2013

(30) Foreign Application Priority Data

Oct. 28, 2010  (PL) ..................................... 119455 U
Oct. 28, 2010  (PL) ......................................... 392787

(51) Int. Cl.
*F16K 31/44*    (2006.01)
*F16K 25/00*    (2006.01)
*F16K 1/10*     (2006.01)

(52) U.S. Cl.
CPC .................. *F16K 1/10* (2013.01); *F16K 25/005* (2013.01)
USPC ............................ 251/266; 251/282; 251/357

(58) Field of Classification Search
CPC ........ F16K 1/42; F16K 31/508; F16K 39/022; F16K 31/0693
USPC ................... 251/209, 267, 268, 269, 270, 282
See application file for complete search history.

(56) References Cited

U.S. PATENT DOCUMENTS 956,811 A  *  5/1910  Leadbeater ................... 251/270
1,085,054 A  *  1/1914  Marsh .......................... 251/270

(Continued)

FOREIGN PATENT DOCUMENTS

DE  804151 C   4/1951
DE  2726702 A1  1/1979

(Continued)

*Primary Examiner* — John Rivell
*Assistant Examiner* — Matthew W Jellett
(74) *Attorney, Agent, or Firm* — Christopher L. Parmelee; Walker & Jocke

(57) ABSTRACT

The invention provides a balancing valve. The balancing valve (1) is provided with a body (2) that has two connector pipes (3 and 4). In the body (2) a seat (5) is housed which is closed with a head (6) mounted on a stem (7) where the stem (7) is seated in a gland (9). Outside the gland (9) there is a knob (10) engaged with the stem (7). The head (6) is made of plastics and it is connected with an adjustment ring (12) which is made of plastics.

9 Claims, 6 Drawing Sheets

(56) References Cited

U.S. PATENT DOCUMENTS

| | | | | |
|---|---|---|---|---|
| 1,952,430 | A | * | 3/1934 | Glab ........................ 137/599.18 |
| 1,958,988 | A | * | 5/1934 | Eisele ........................... 251/270 |
| 2,152,831 | A | * | 4/1939 | Williams ...................... 251/210 |
| 3,111,141 | A | * | 11/1963 | Hughes .................... 137/630.22 |
| 3,327,992 | A | * | 6/1967 | Nelson et al. ................. 251/267 |
| 5,566,711 | A | | 10/1996 | Glansk et al. |
| 7,753,341 | B2 | * | 7/2010 | Guidi ........................... 251/268 |
| 8,141,582 | B2 | * | 3/2012 | Fukano et al. ................ 137/556 |
| 2003/0079784 | A1 | | 5/2003 | Toliusis |
| 2003/0205687 | A1 | | 11/2003 | McPeak et al. |
| 2010/0108920 | A1 | * | 5/2010 | Tatarek ........................... 251/61 |
| 2011/0017930 | A1 | * | 1/2011 | Marcichow et al. ..... 251/129.04 |

FOREIGN PATENT DOCUMENTS

| | | |
|---|---|---|
| DE | 19745751 A1 | 5/1999 |
| DE | 19833679 C1 | 2/2000 |
| EP | 1229280 A1 | 8/2002 |
| GB | 1414838 A | 11/1975 |
| WO | 03044403 A1 | 5/2003 |

* cited by examiner

BALANCING VALVE

The subject invention provides a balancing valve.

Balancing valves are designed for adjustment and closing of the flow in central heating networks, in hot and cold utility water installations, in air conditioning and cooling installations.

An adjustment poppet valve is known that is formed of a body closed with a cover, and with a seat of which a suitably shaped head on a stem cooperates.

The stem has a knob at one end and is guided in a threaded part in the cover where it is also sealed. The valve is provided with a scale that shows the positioning of the head relative to the seat. Usually, the scale shows the number of turns of the stem from the complete closing state and division of one full turn.

An important issue in the construction of an adjustment valve is to obtain repeatability of the assumed extent of the valve aperture, so as to make the construction allow to close the valve when needed, where re-opening is possible solely to a preset value.

Known balancing valves are provided with a head assembly which is constituted by a head and an adjustment ring made of metal. Most frequently, the latter is cast iron or non-ferrous metal alloys. Closing heads made of these materials require high precision mechanical shaping. Such heads are at the same time expensive in manufacturing due to both the material cost, in particular of non-ferrous metals, and the machining costs related first to casting a product and then to mechanical shaping thereof.

Heads made of metal are very susceptible to precision of manufacture and in the case of even minor dimensioning defects they may cause leakages at the contact area with the seat, and this is why in valves of this kind, equipped with metallic heads, it is necessary to use additional solutions to enhance sealing between the seat and the valve, for example resilient head suspension.

The balancing valve according to the invention is provided with a body having two connector pipes. In the body, a seat is housed, said seat being closed by a head fixed on a stem which stem is fixed on a gland. Outside the gland there is a knob engaged to the stem. The head of the valve is made of plastics.

Preferably, the valve head is connected to an adjustment ring made of plastics.

It is preferable for the head and adjustment ring to be connected by means of a threaded connection, and between the head and the adjustment ring a head seal is positioned.

It is also preferable to have the thread of the threaded connection formed both in the head and in the adjustment ring.

Another preferable feature is that the threaded connection between the head and the adjustment ring is secured with a self-tapping screw.

It is also preferable to make the head of polysulfone.

It is preferable to make the adjustment ring of polysulfone.

It is preferable to make the head by an injection method.

It is also preferable to make the adjustment ring by a injection method.

Another preferable feature is that the head is constituted by an inner sleeve, closed at side of the valve closing seat, provided with an external ring extending in proximity of the closed side of the sleeve.

It is preferable to provide the head with an outer sleeve extending from the external ring in a direction coincident with the extension of the internal sleeve, where both sleeves are coaxial.

It is also preferable to provide the side of the head closed on the seat side in the proximity of the inner sleeve, with relief openings.

Another preferable feature is that the internal part of the inner sleeve is provided with a thread, and preferably the thread is formed in an insert, and more preferably the threaded insert is made of metal.

BRIEF DESCRIPTION OF THE DRAWINGS

The object of the invention is presented by its embodiments in the drawings.

DETAILED DESCRIPTION

Figure 1:
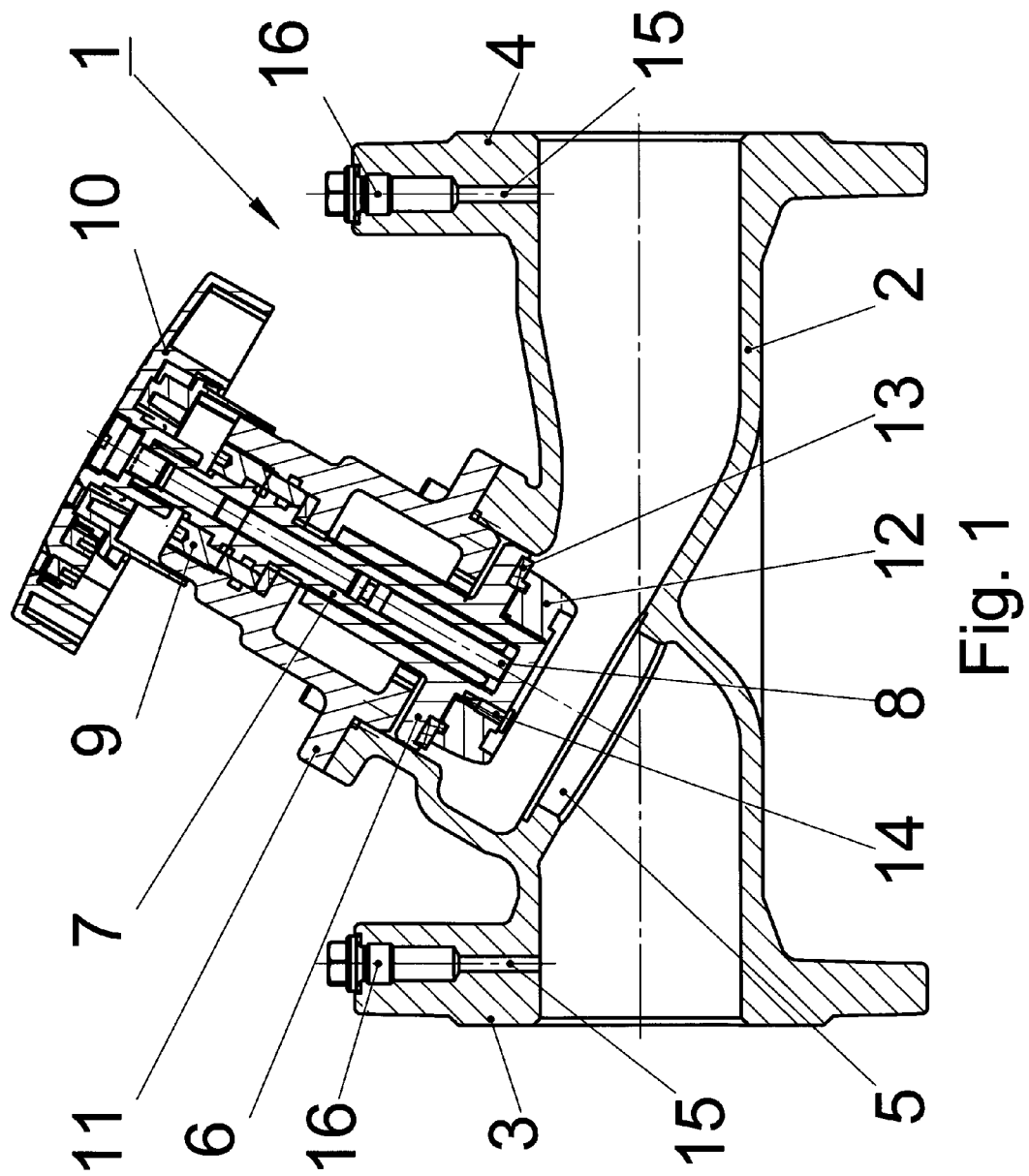
FIG. 1 shows a valve of the first embodiment in an axial section.

As shown in the drawing of FIG. 1, a balancing valve 1 has a body 2 provided with two connector pipes, an inlet connector pipe 3 and an outlet connector pipe 4. In the body 2 a seat 5 is housed, said seat being closed with a head 6 mounted on a stem 7. Inside the stem 7 an aperture stop 8 is positioned that stops the opening movement of the head 6. The stem is seated in a gland 9 and it is terminated at the opposite side of the head 6 with a knob 10 used to open and close the valve 1. The head 6 along with the stem 7 and gland 9 are housed in a cover 11 that closes the opening over the seat 5 in the body 2 of the valve 1.

The head 6 is connected to an adjustment ring 12 on the seat 5 side of the valve 1. The connection of the head 6 with the adjustment ring 12 is a threaded connection, and on the head 6 an outer thread is formed, while in the adjustment ring 12 an internal thread is formed. Between the head 6 and the adjustment ring 12 there is placed a seal 13 of the head 6, formed in an L shape and seated at one side in a groove formed in the adjustment ring 12, and on the other side in a groove formed in the front surface of the head 6. In assembling of the head 6 with the adjustment ring 12 on the threaded connection, the position of the seal 13 of the head 6 becomes fixed. Upon assembling of the head 6 with the adjustment ring 12 the threaded connection is locked by a self-tapping screw 14 that is screwed in.

The head 6 and the adjustment ring 12 are made of plastics which is a polysulfone being a polymer containing a —$SO_2$— group and an aromatic ring in the main chain. Both the head 6 and the adjustment ring 12 are made by an injection method, while subject to mechanical shaping are solely some surfaces, for example the ones where the seals are located. Thus in the embodiment shown in FIG. 2 and FIG. 3 mechanical shaping is solely carried out on the cylindrical surface of the head on which an O-ring type sealing operates, while in FIG. 1 no head surfaces are subject to mechanical shaping.

The inlet connector pipe 3 and the outlet connector pipe 4 in the body 2 of the valve 1 are provided with control passages 15 that are closed with plugs 16.

Figure 2:
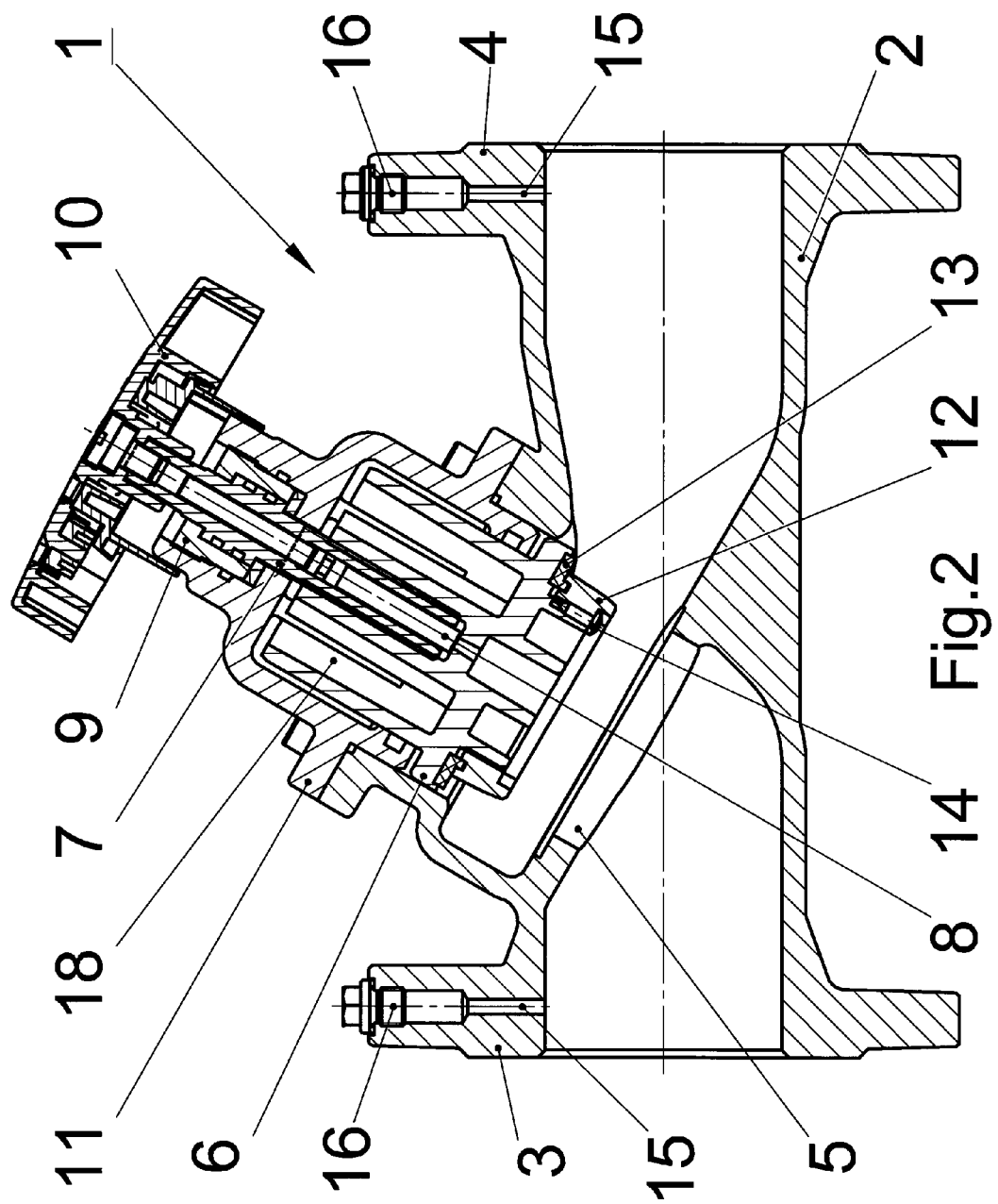
FIG. 2 shows a valve of a second embodiment in an axial section.
Figure 3:
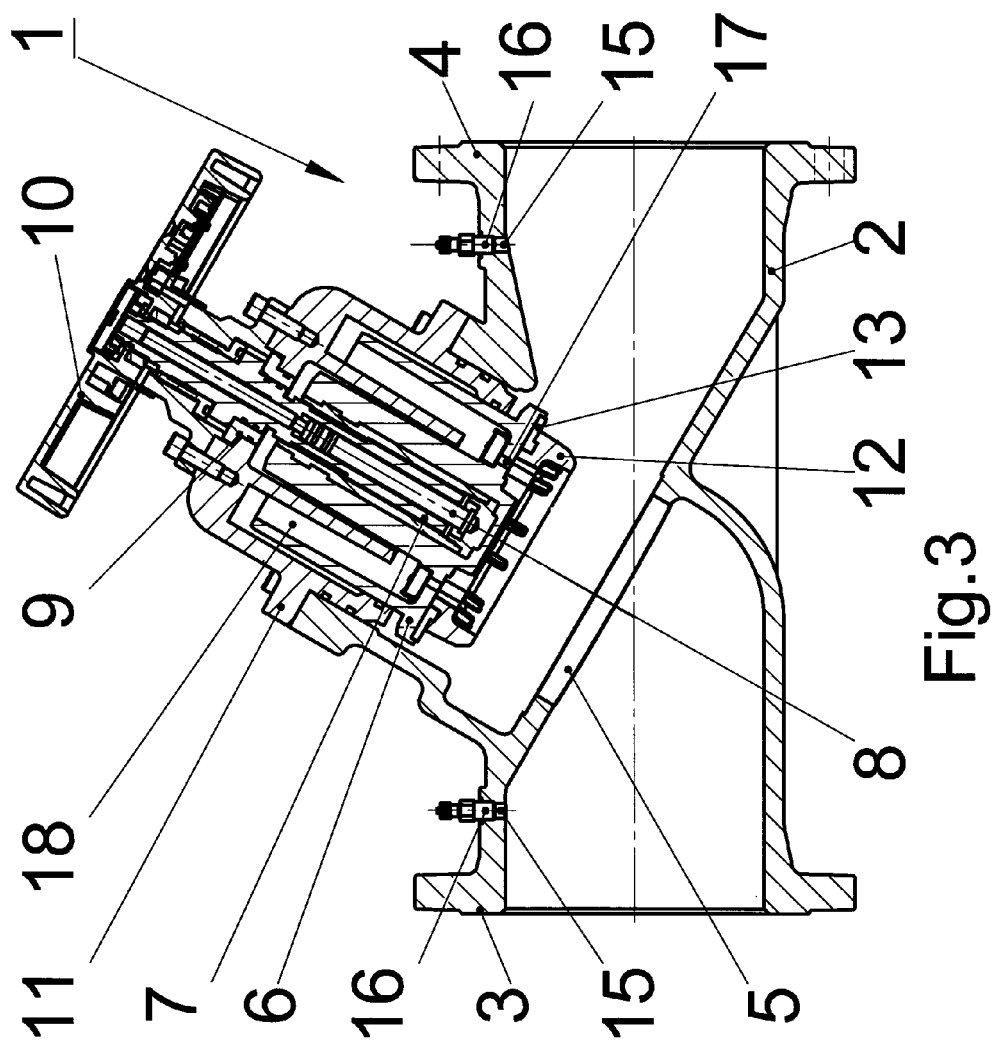
FIG. 3 shows a valve of a third embodiment in an axial section.

As shown in FIG. 2 and FIG. 3, the valve 1 of the invention may be in various embodiments based on the same principle, where the reference numerals of FIG. 1 correspond to analogous components of the valve 1 in FIG. 2 and FIG. 3.

The balancing valves shown in FIG. 2 and FIG. 3, according to the invention, are relief-type valves and thus they allow for easier closing of the valve 1 which under high pressures and large effective flow area through the seat 5 of the valve 1 constitute a considerable operational facility. Relieving of the valve 1 consists on balancing of the pressures at both sides of the head 6 with adjustment rings 12 by means of forming openings 17 in the head 6 as it is known from the prior art and forming a sealed pressure compensating chamber 18 over the head.

The head 1 has an internally formed thread that cooperates with a thread formed on the outer surface of the stem 7.

For particularly large valves 1, the head 6 may be equipped inside with a metallic threaded sleeve that cooperates with the stem 7 threaded on its external surface.

Figure 4:
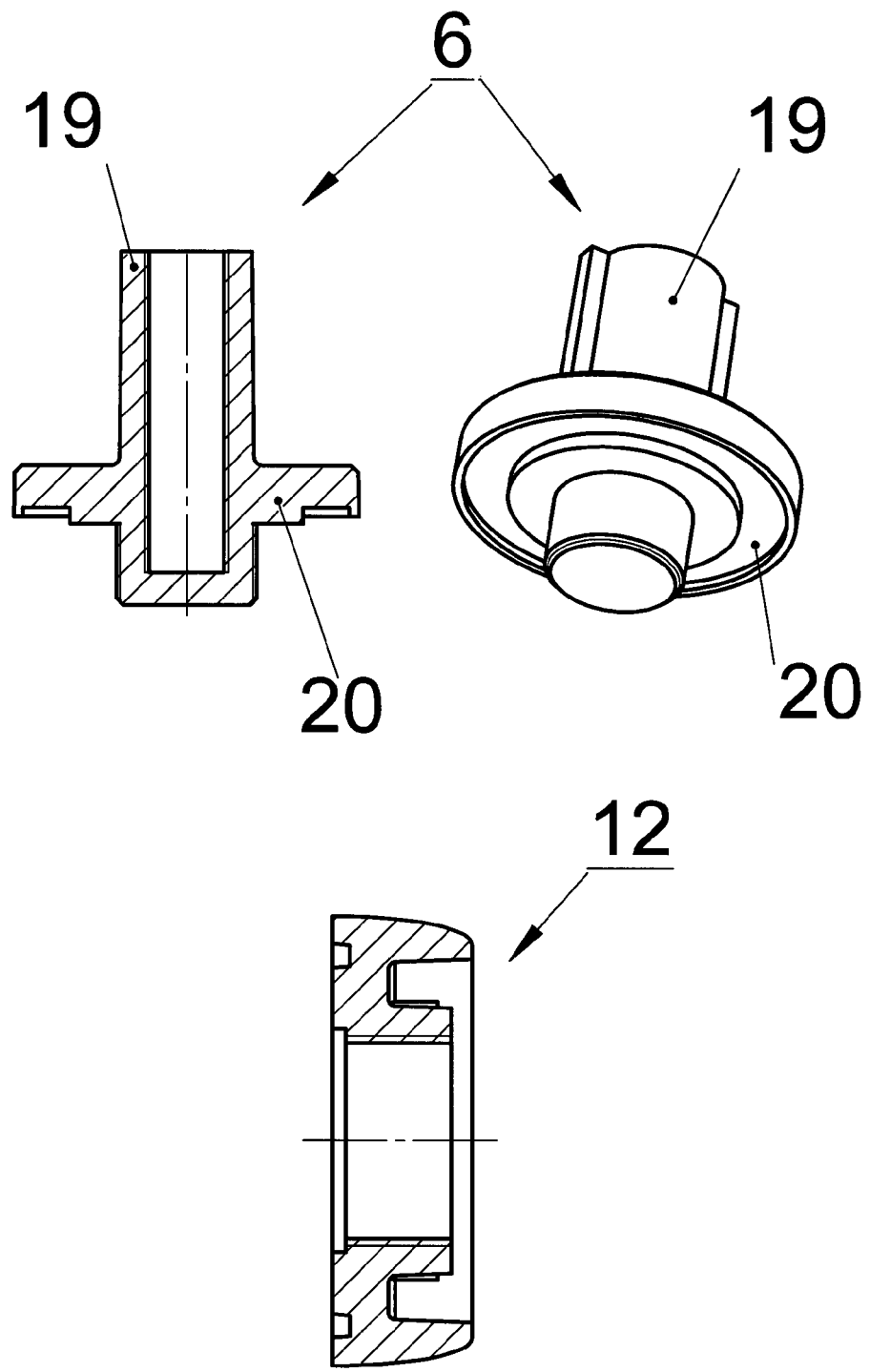
FIG. 4 shows valve components in a section and in a view of the first embodiment.
Figure 5:
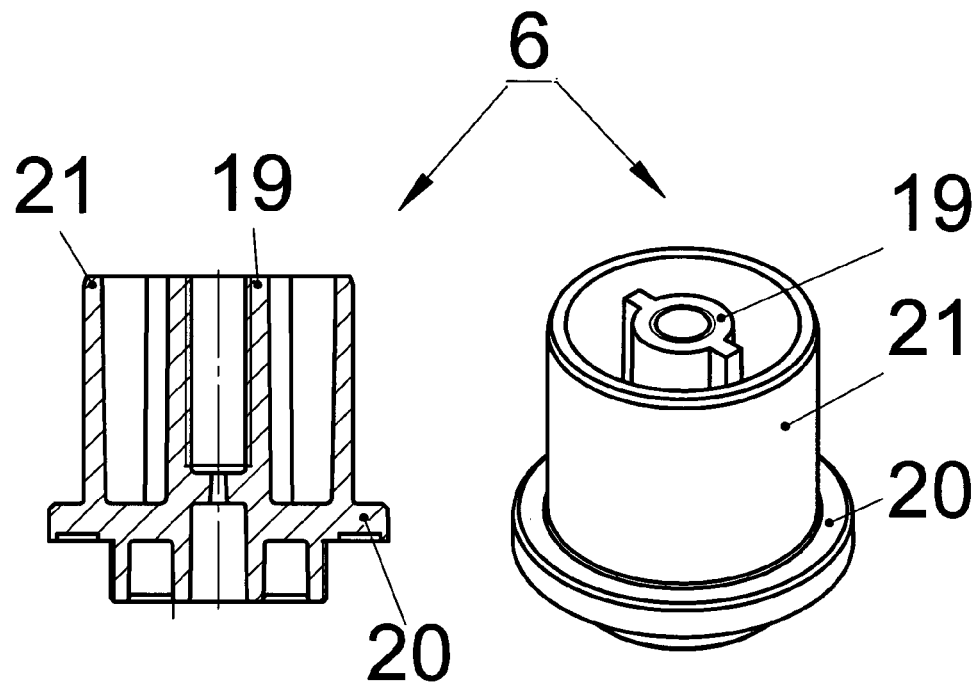
FIG. 5 shows valve components in a section and in a view of the second embodiment.
Figure 5:
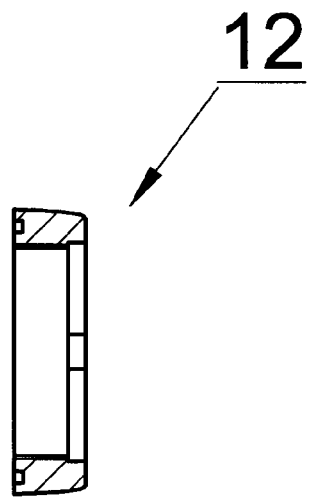
Figure 6:
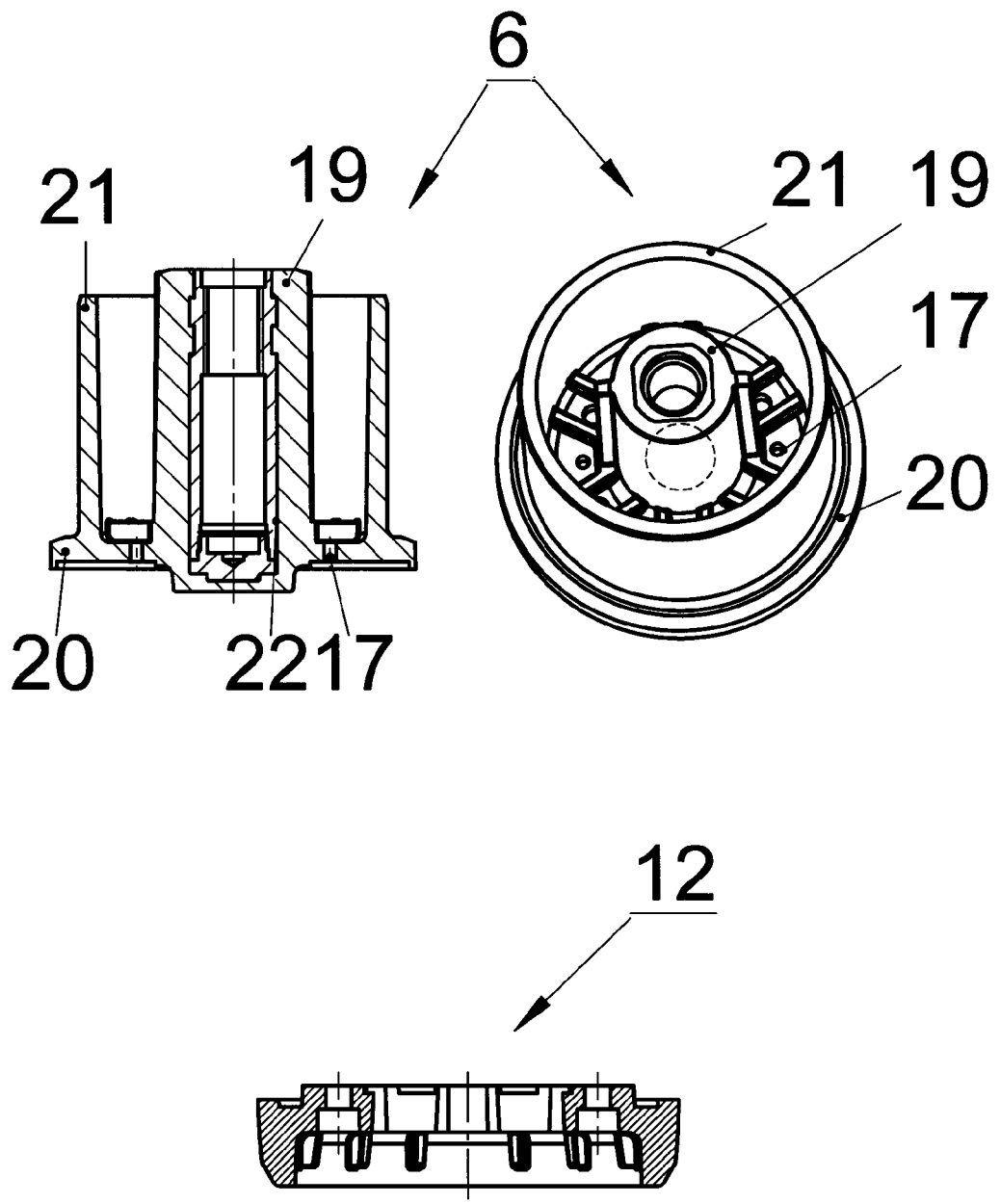
FIG. 6 shows valve components in a section and in a view of the third embodiment.

As shown in the drawing of FIG. 4, FIG. 5 and FIG. 6, the valve 1 comprises a head 6 and an adjustment ring 12 connected therewith. In the drawing of FIG. 4, FIG. 5 and FIG. 6, the components of the valve 1 are shown in an exploded view.

The head 6 is also made of plastics which in this case is polysulfone. Also the adjustment ring 12 is made of polysulfone. The head 6 of the valve 1 is formed in a shape of an inner sleeve 19 closed from the seat 5 side of the valve 1. The inner sleeve 19 is provided with an external ring 20 extending in proximity of the closed side of the inner sleeve 19 of the head 6 of the valve 1. The inner sleeve 19 and the external ring 20 are coaxial. The external ring 20 of the head 6 of the valve 1 has, on the seat 5 side of the valve 1, a seat where a seal 13 of the head 6 of the valve 1 is housed.

In the embodiment shown in FIG. 5 and Fog. 6, constituting a solution intended for larger valves of higher pressures and larger effective cross-section, the head 6 of the valve 1 has an outer sleeve 21. The outer sleeve 21 of the head 6 of the valve 1 extends from the external ring 20 outside the inner sleeve 19 and is coaxial therewith. The external ring 20 in proximity of the space of the head 6 of the valve 1 between the inner sleeve 19 and the outer sleeve 21 has relief openings 17.

The head 6 of the valve 1 and the adjustment ring 12 are connected by means of a threaded connection. The thread of this connection is formed on the outer surface of the internal sleeve 19 below the external ring 20 and on the inner surface of the opening in the adjustment ring 12. This direct connection between the components of the valve is shown in FIG. 4 and FIG. 5. FIG. 3 and FIG. 6 show a solution for threaded connection between the valve components effected by means of bolts, i.e. intermediate elements. In assembling the components of the valve, between the head 6 and the adjustment ring 12 a seal 13 is positioned.

The inner part of the inner sleeve 19 shown in FIG. 1 and FIG. 2 is provided, above the external ring 20 seen from the side of the seat 5 of the valve 1, with a thread formed directly in the material of the head 6. For large valves intended for high pressures and flows, within the inner sleeve 19, a threaded insert 22 is placed. The threaded insert 22 is shown in FIG. 6 and it can be made of metal, such as for example brass.

Embodiments of the balancing valve according to the invention make it possible to achieve several objectives at the same time. It provides for lowering of the manufacturing costs, enhances the corrosion resistance of the head 6 of the valve 1, and at the same time, due to the properties of the material of which the head 6 and adjustment ring 12 are made, it allows for self-adjusting of the head 6 and the adjustment ring 12 fitted into the valve seat, resulting from elasticity of the plastics.

The invention claimed is:

1. A balancing valve comprising:
a body having two connector pipes, where a seat is housed, said seat being closed with a head mounted on a stem, which stem is seated in a gland outside of which a knob connected with the stem is positioned, wherein the head is made of a plastic material, wherein the head is connected to an adjustment ring which is made of a plastic material, wherein the head is comprised of an inner sleeve having a closed side at a closing seat side of the valve, wherein the head includes an integral external ring extending radially from the inner sleeve in proximity of the closed side of the inner sleeve, wherein the head including the inner sleeve and the external ring constitutes a single piece made of the plastic material, wherein the head and the adjustment ring are connected by a threaded connection such that the adjustment ring extends around the inner sleeve at the closed side of the inner sleeve between the external ring and the closing seat side of the valve, wherein a head seal is positioned between the external ring and the adjustment ring, wherein the thread of the threaded connection is formed both in an outer surface of the inner sleeve of the head and in an inner surface of the adjustment ring, wherein the threaded connection between the head and the adjustment ring is secured by a self-tapping screw, wherein the head is provided with an integral outer sleeve extending from the external ring in a direction coincident with the extension of the inner sleeve, where both sleeves are coaxial.

2. The valve of claim 1, wherein the head is a single part made of polysulfone.

3. The valve of claim 2, wherein the adjustment ring is made of polysulfone.

4. The valve of claim 3, wherein the head is made by an injection method.

5. The valve of claim 4, wherein the adjustment ring is made by an injection method.

6. The valve of claim 5, wherein a side of the head closed from the closing seat side of the valve and in proximity of the inner sleeve, is provided with relief openings.

7. The valve of claim 5, wherein an inner part of the inner sleeve is provided with a thread.

8. The valve of claim 7, wherein the inner part of the inner sleeve is provided with a threaded insert.

9. The valve of claim 8, wherein the threaded insert is made of metal.

* * * * *